United States Patent
Brid et al.

(10) Patent No.: US 12,475,437 B2
(45) Date of Patent: Nov. 18, 2025

(54) INTELLIGENT TIME AND ATTENDANCE MANAGEMENT SYSTEM AND METHOD THEREOF

(71) Applicant: HCL Technologies Limited, New Delhi (IN)

(72) Inventors: Devendra Brid, Navi Mumbai (IN); Asim Prakash Jena, Bengaluru (IN); Arvind Maurya, Noida (IN)

(73) Assignee: HCL Technologies Limited, New Delhi (IN)

( * ) Notice: Subject to any disclaimer, the term of this patent is extended or adjusted under 35 U.S.C. 154(b) by 308 days.

(21) Appl. No.: 18/110,393

(22) Filed: Feb. 16, 2023

(65) Prior Publication Data
US 2023/0306374 A1   Sep. 28, 2023

(30) Foreign Application Priority Data
Mar. 27, 2022   (IN) .............................. 202211017642

(51) Int. Cl.
*G06Q 10/1091* (2023.01)
*G06F 1/16* (2006.01)

(52) U.S. Cl.
CPC ......... *G06Q 10/1091* (2013.01); *G06F 1/163* (2013.01)

(58) Field of Classification Search
CPC ............................ G06Q 10/1091; G06F 1/163
USPC ......................................................... 705/32
See application file for complete search history.

(56) References Cited

U.S. PATENT DOCUMENTS

| | | | |
|---|---|---|---|
| 9,805,342 B2 | 10/2017 | Dickerson et al. | |
| 2004/0251304 A1 | 12/2004 | Carmon et al. | |
| 2012/0161971 A1* | 6/2012 | Nasir ....................... | G07C 1/10 340/573.4 |

(Continued)

FOREIGN PATENT DOCUMENTS

| | | |
|---|---|---|
| CN | 113012311 A | 6/2021 |
| WO | 2016170005 A1 | 10/2016 |
| WO | 2021246581 A1 | 12/2021 |

OTHER PUBLICATIONS

Muhammad Bilal Khan et al. Non-Contact Smart Sensing of Physical Activities during Quarantine Period Using SDR Technology. Sensors; Basel vol. 22, Iss. 4, (2022): 1348. (Year: 2022).*

(Continued)

*Primary Examiner* — Fawaad Haider
(74) *Attorney, Agent, or Firm* — Kendal M. Sheets

(57) ABSTRACT

The disclosure relates to method and system for intelligently managing time and attendance of a user in an establishment. The method includes recording, by a custom wearable device, a set of evaluation parameters associated with the user; receiving, by an intelligent Access Point Network (IAPN), the set of evaluation parameters from the custom wearable device; computing, by a distance calculator, a distance of the custom wearable device from the IAPN; determining, by an intelligent monitoring subsystem, a valid usage of the custom wearable device based on the set of evaluation parameters using a first trained machine learning model; determining one of a valid presence or a valid movement of the custom wearable device based on the set of evaluation parameters and the distance using a second trained machine learning model; and generating an alert in response to determination of at least one the valid usage or the valid presence.

13 Claims, 13 Drawing Sheets

(56) References Cited

U.S. PATENT DOCUMENTS

2023/0263419 A1* 8/2023 Cashmore ............. G06N 3/084
                                                                                 600/547

OTHER PUBLICATIONS

Sutjarittham, Thanchanok. Modelling and Optimisation of Resource Usage in an IoT Enabled Smart Campus. 2021. (Year: 2021).*
Staffing Management, The best way to track employee attendance, Workforce.com, Mar. 17, 2021, by Staff Report.
UNOLO, Unolo.com, Smartsense Technologies Pvt. Ltd. 2018-2020, India.
Tarikul Islam and Subhas Chandra Mukopadhayay, Wearable Sensors Applications, design and implementation, Published Dec. 2017 • Copyright © IOP Publishing Ltd 2017 pp. 1-1 to 1-31.

* cited by examiner

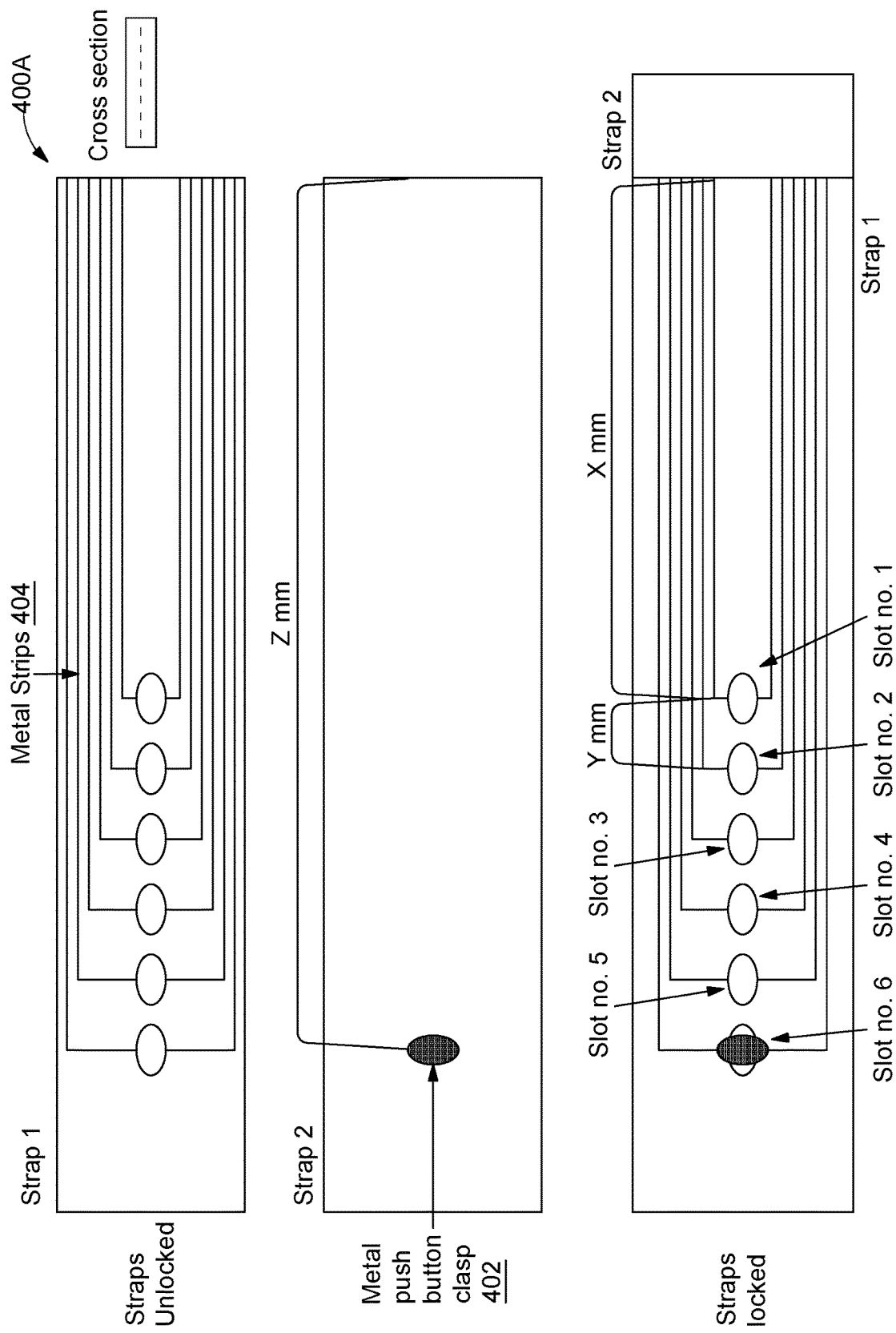

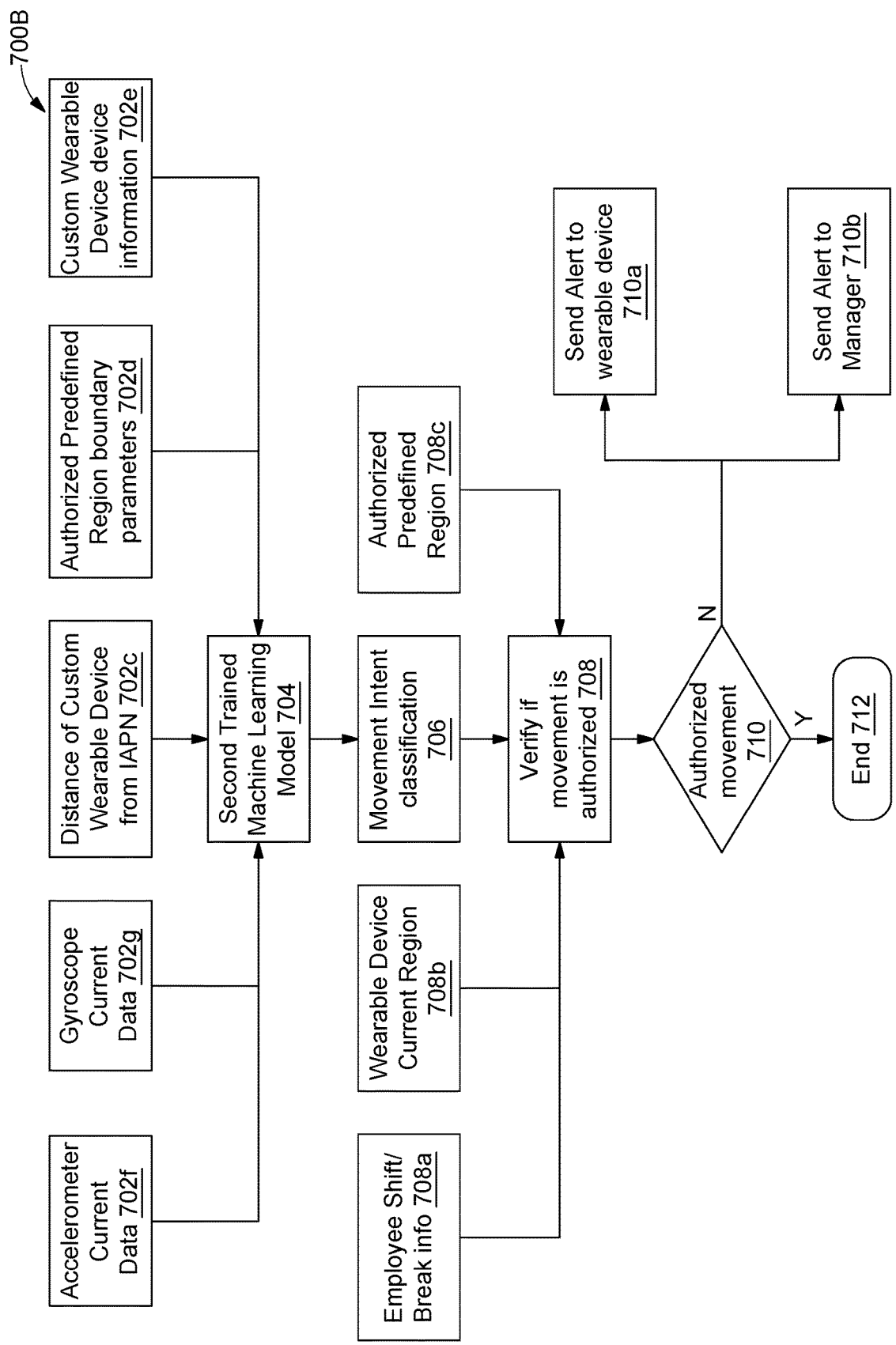

INTELLIGENT TIME AND ATTENDANCE MANAGEMENT SYSTEM AND METHOD THEREOF

TECHNICAL FIELD

This disclosure relates generally to time and attendance management, and more particularly to a system and method for intelligent time and attendance management using wearable devices and intelligent access point networks.

BACKGROUND

In many workplaces it may be important to ensure that the employees are available in their designated work locations and only authorized workers may be working in the respective work location. Therefore, monitoring may be needed in any organization (for example, in a retail store) where employees need to be available only in their designated work areas. Consider a workplace of the retail store that may be divided into different sections. Each section may be focused on specific purpose, and each section may require specific skills workforce. For example, the employees working in apparels may require knowledge on clothing lines, brands, etc. While in electronics section employees working need to have more technical knowledge as compared to employee working in Grocery section. It is therefore important that the employee needs to be in his/her allotted section during their shift time.

There may be a potential revenue loss if customer needs help and employee moves away from their assigned section. There may also be a potential impact of revenue if the particular item runs out on the shelf and is not restocked because of employee not being in his assigned section. In larger retail stores it may not always be possible for managers to validate the physical presence of the employee. Therefore, in order to monitor the attendance of the employees, a monitoring device may be introduced. There may be situations where employees may give their time and attendance monitoring devices to their colleagues or friends. However, the colleagues may then use the device to mark employee's attendance as a proxy.

Therefore, there is a need in the art for improved methods and systems for intelligently managing time and attendance of a user in an establishment which may be capable of identifying a valid usage, a valid presence or a valid movement of a custom wearable device within an authorized predefined region.

SUMMARY

In one embodiment, an intelligent time and attendance management system is disclosed. In one example, the intelligent time and attendance management system may include a plurality of custom wearable devices configured to be worn by a plurality of users within a set of predefined regions. Each of the plurality of custom wearable devices may record a set of evaluation parameters associated with a corresponding user, from among the plurality of users, using a set of sensors. The system may further include an Intelligent Access Point Network (IAPN) installed within each of the set of predefined regions and configured to receive the set of evaluation parameters from each of a set of custom wearable devices, from among the plurality of custom wearable devices, within a corresponding predefined region using a wireless signal. The IAPN may include a distance calculator configured to calculate a distance of each of the set of custom wearable devices from the IAPN based on a wavelength and a frequency of the wireless signal received from the corresponding custom wearable device. The system may further include an intelligent monitoring subsystem that may be configured to determine, for each of the plurality of custom wearable devices, a valid usage of the corresponding custom wearable device based on the set of evaluation parameters using a first trained machine learning model. Determining the valid usage may include determining whether the user wearing the corresponding custom wearable device is an authorized user to wear the custom wearable device. The intelligent monitoring subsystem may be further configured to determine, for each of the plurality of custom wearable devices, one of a valid presence or a valid movement of the corresponding custom wearable device based on the set of evaluation parameters and the distance using a second trained machine learning model. Determining the valid presence or the valid movement may include determining whether the corresponding custom wearable device is within or outside an authorized predefined region. The intelligent monitoring subsystem may be further configured to generate, for one or more of the plurality of wearable devices, an alert in response to determination of at least one the valid usage or the valid presence.

In another embodiment, a method for intelligently managing time and attendance of a user in an establishment is disclosed. In one example, the method may include recording, by a wearable device worn by the user in a predefined region, a set of evaluation parameters associated with the user. The method may further include receiving, by an intelligent Access Point Network (IAPN) installed within the predefined region, the set of evaluation parameters from the custom wearable device using a wireless signal. The method may further include computing, by a distance calculator of the IAPN, a distance of the custom wearable device from the IAPN based on a wavelength and a frequency of the wireless signal received from the custom wearable device. The method may further include determining, by an intelligent monitoring subsystem, a valid usage of the custom wearable device based on the set of evaluation parameters using a first trained machine learning model. Determining the valid usage may include determining whether the user wearing the wearable device is an authorized user to wear the custom wearable device. The method may further include determining, by the intelligent monitoring subsystem, one of a valid presence or a valid movement of the custom wearable device based on the set of evaluation parameters and the distance using a second trained machine learning model. Determining the valid presence or the valid movement may include determining whether the custom wearable device is within or outside an authorized predefined region. The method may further include generating, by the intelligent monitoring subsystem, an alert in response to determination of at least one the valid usage or the valid presence.

In yet another embodiment, a computer program product for intelligently managing time and attendance of a user in an establishment is disclosed. In one example, the computer program product is embodied in a non-transitory computer readable storage medium and includes computer instructions for recording, by a wearable device worn by the user in a predefined region, a set of evaluation parameters associated with the user. The computer instructions may further include receiving, by an intelligent Access Point Network (IAPN) installed within the predefined region, the set of evaluation parameters from the custom wearable device using a wireless signal. The computer instructions may further include computing, by a distance calculator of the IAPN, a distance of the custom wearable device from the IAPN based on a wavelength and a frequency of the wireless signal received from the custom wearable device. The computer instructions may further include determining, by an intelligent monitoring subsystem, a valid usage of the custom wearable device based on the set of evaluation parameters using a first trained machine learning model. Determining the valid usage may include determining whether the user wearing the wearable device is an authorized user to wear the custom wearable device. The computer instructions may further include determining, by the intelligent monitoring subsystem, one of a valid presence or a valid movement of the custom wearable device based on the set of evaluation parameters and the distance using a second trained machine learning model. Determining the valid presence or the valid movement may include determining whether the custom wearable device is within or outside an authorized predefined region. The computer instructions may further include generating, by the intelligent monitoring subsystem, an alert in response to determination of at least one the valid usage or the valid presence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A illustrates wrist straps with sensors of the custom wearable device for calculating wrist size of user, in accordance with some embodiments of the present disclosure.

FIG. 7B illustrates an exemplary process for determining one of a valid presence or a valid movement of the custom wearable device based on the second machine learning model, in accordance with some embodiments of the present disclosure.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
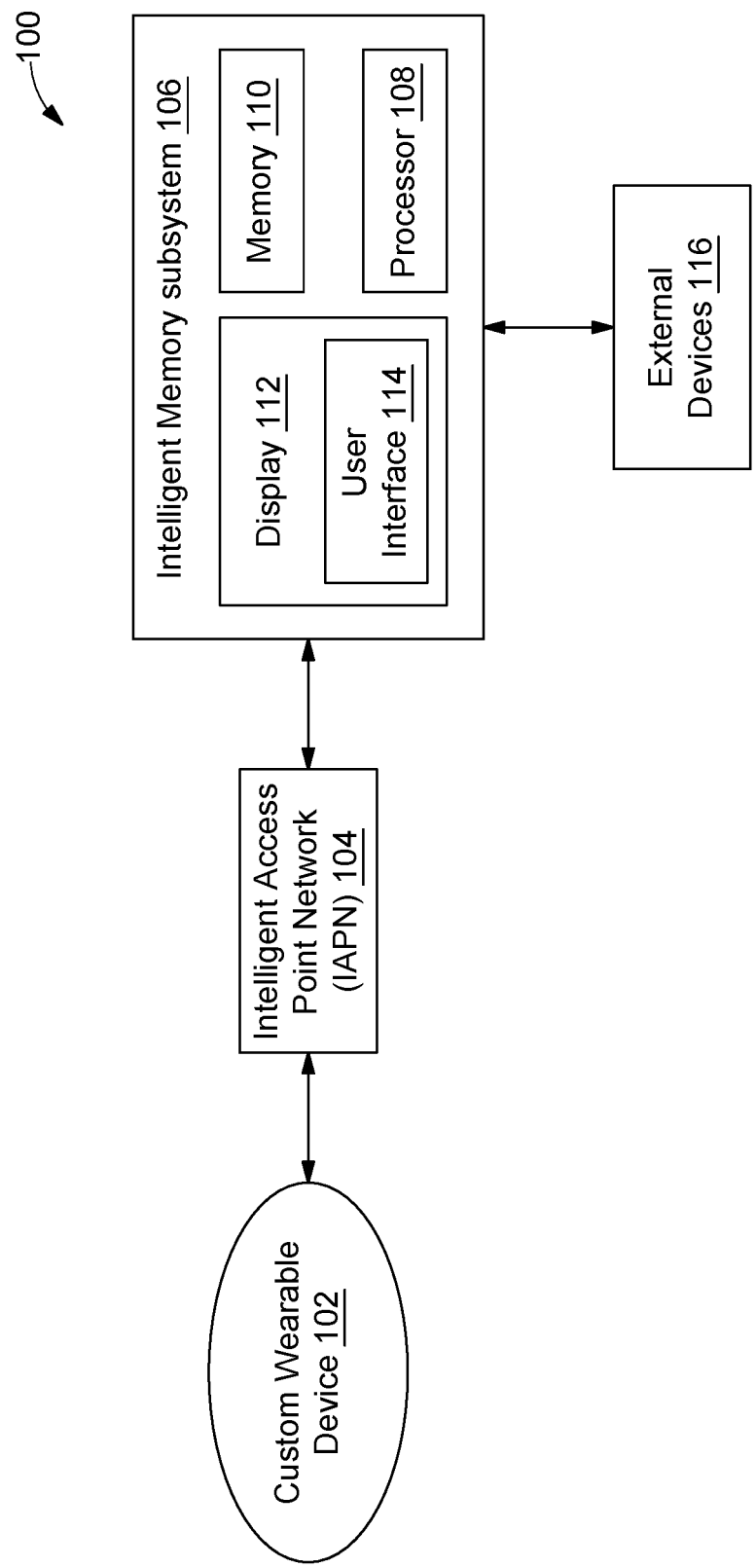
FIG. 1 is a block diagram illustrating an intelligent time and attendance management system, in accordance with some embodiments of the present disclosure.

Referring now to FIG. 1, a block diagram of an intelligent time and attendance management system 100 is illustrated, in accordance with some embodiments. The intelligent time and attendance management system 100 may include a custom wearable device 102. The custom wearable device 102 may be configured to worn by a user within a predefined region. Examples of the custom wearable device 102 may include, but are not limited to, wrist bands, smart watches, body mounted sensors, rings, or the like.

Further, the custom wearable device 102 may record a set of evaluation parameters associated with the user using a set of sensors. The set of evaluation parameters may include at least one of gyroscope data, accelerometer data, and a wrist size of the corresponding user.

The intelligent time and attendance management system 100 may further include an Intelligent Access Point Network (IAPN) 104 that may be installed within the predefined region. In particular, the IAPN 104 may be installed on a ceiling of the predefined region. Once the set of evaluation parameters are recorded by the custom wearable device 102, the IAPN 104 may receive the set of evaluation parameters from the custom wearable device 102, using a wireless signal (for example, an infra-red (IR) signal).

The IAPN 104 may further include a distance calculator to calculate a distance of the custom wearable device 102 from the IAPN 104 based on a wavelength and a frequency of the wireless signal received from the custom wearable device 102. A method of calculating the distance of the custom wearable device 102 from the IAPN 104 is further explained in greater detail in conjunction with FIG. 5. The intelligent time and attendance management system 100 may further include an intelligent monitoring subsystem 106 that may be configured to determine a valid usage of the custom wearable device 102 based on the set of evaluation parameters using a first trained machine learning model. In order to determine the valid usage, the intelligent monitoring subsystem 106 may determine whether the user wearing the custom wearable device 102 is an authorized user to wear the custom wearable device 102.

The intelligent monitoring subsystem 106 may further determine one of a valid presence or a valid movement of the custom wearable device 102 based on the set of evaluation parameters and the distance using a second trained machine learning model. In order to determine the valid presence or the valid movement, the intelligent monitoring subsystem 106 may determine whether the custom wearable device 102 is within or outside an authorized predefined region. The intelligent monitoring subsystem 106 may further generate an alert in response to determination of at least one the valid usage or the valid presence. The complete process followed by the system 100 is further explained in detail in conjunction with FIG. 2 to FIG. 10.

The intelligent monitoring subsystem 106 may further include a processor 108 that is communicatively coupled to a memory 110. which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM).

The memory 110 may store instructions that, when executed by the processor 108, may cause the processor 108 to intelligently manage time and attendance of a user in an establishment. The memory 110 may also store various data (e.g., gyroscope data, accelerometer data, and wrist size of the corresponding user, historical evaluation parameters data, historical distance information, authorized predefined region historic data, current region data, unique user identity associated with each of the plurality wearable device, etc.) that may be captured, processed, and/or required by the intelligent monitoring subsystem 106 to intelligently manage time and attendance of the user in the establishment.

The intelligent monitoring subsystem 106 may further include a display 112. The display 112 may include a user interface 114. The end-user may interact with the intelligent monitoring subsystem 106 and vice versa via the user interface 114 accessible via the display 112. By way of an example, the display 112 may be used to display results (i.e., the valid usage of the custom wearable device 102, the valid presence, or the valid movement of the custom wearable device 102 within or outside the authorized predefined region, distance information of the wearable device 102 from the IAPN 104), to the end-user (i.e., managers, employers, chief executive, etc.).

The system 100 may also include one or more external devices 116. In some embodiments, the intelligent monitoring subsystem 106 may interact with the one or more external devices 116 over a communication network for sending or receiving various data. Examples of the external devices 116 may include, but are not limited to, computer, tablet, smartphone, and laptop. The communication network, for example, may be any wired or wireless network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
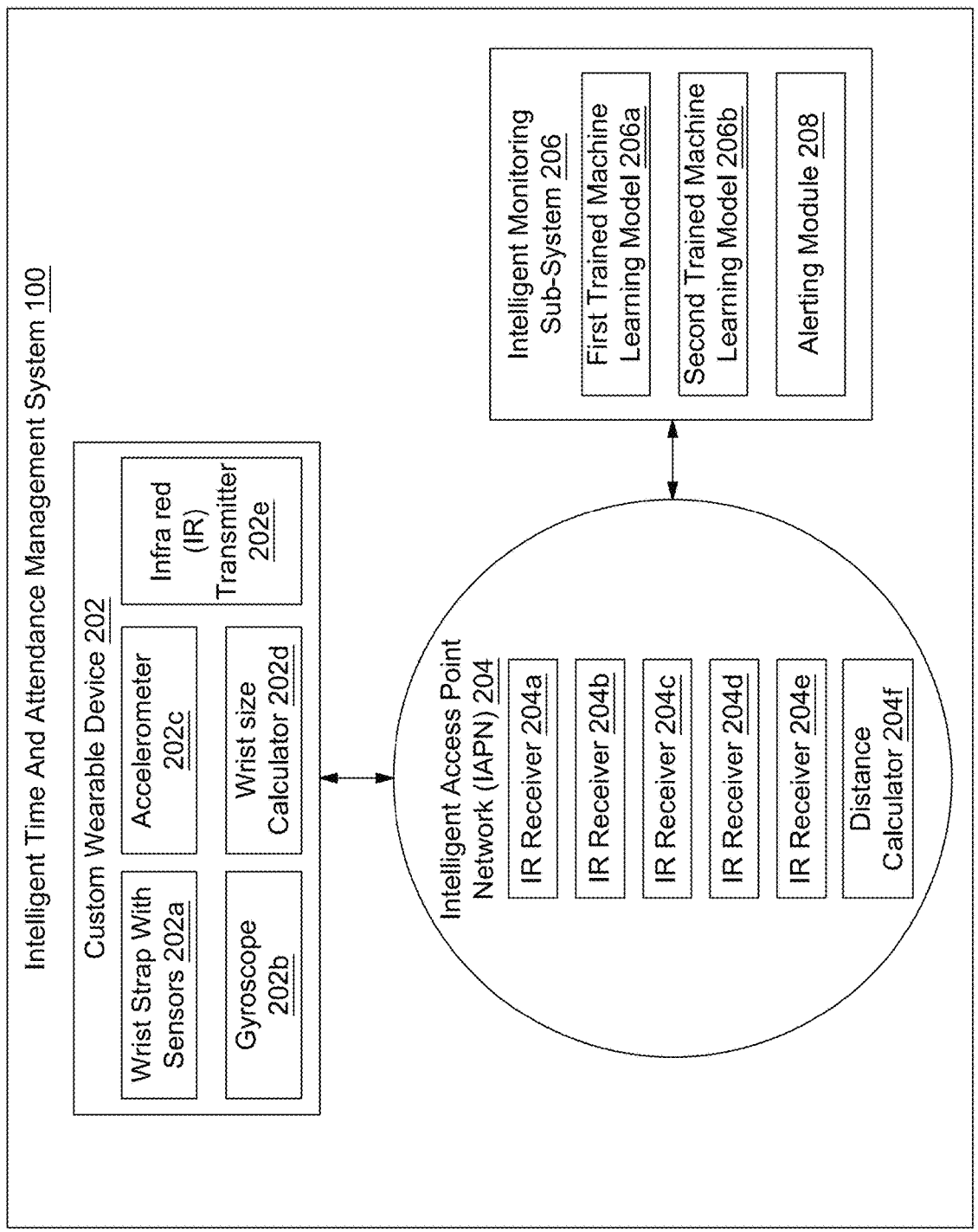
FIG. 2 is a block diagram illustrating various components within an intelligent time and attendance management system configured to intelligently manage time and attendance of a user in an establishment, in accordance with some embodiments of the present disclosure.

Referring now to FIG. 2, a block diagram of various components within the intelligent time and attendance management system 100 configured to intelligently manage time and attendance of a user in an establishment is illustrated, in accordance with some embodiments. The intelligent time and attendance management system 100 may include a custom wearable device 202, an intelligent access point network (IAPN) 204, and an intelligent monitoring subsystem 206. In an embodiment, the custom wearable device 202, the IAPN 204, and the intelligent monitoring subsystem 206 of the present FIG. 2 may be analogous to the custom wearable device 102, the IAPN 104, and the intelligent monitoring subsystem 106 of the FIG. 1.

The custom wearable device 202 may include a wrist strap with sensors 202a, a gyroscope 202b, an accelerometer 202c, a wrist size calculator 202d, and an IR transmitter 202e. The custom wearable device 202 worn by a user in a predefined region may be configured to record a set of evaluation parameters associated with the user. The set of evaluation parameters may include at least one of gyroscope data, accelerometer data, and a wrist size of the corresponding user. For example, the gyroscope data may be recorded by the gyroscope 202b, the accelerometer data may be recorded by the accelerometer 202c, and the wrist size of the corresponding user may be calculated by the wrist size calculator 202d. A process of calculating the wrist size of the user is explained in greater detail in conjunction with FIG. 4A and FIG. 4B.

Once the set of evaluation parameters are recorded, the custom wearable device 202 may further transmit the set of evaluation parameters to the IAPN 204 via the IR transmitter 202e. The IAPN 204 may include a plurality of IR receivers that may receive the set of evaluation parameters from the custom wearable device 202. In some embodiments, the IAPN 204 may be installed on a ceiling of the corresponding predefined region. The plurality of IR receivers may include an IR receiver on each of the four sides of the IAPN 204 and an IR receiver in the center of IAPN 204 and facing the ground. For example, an IR receiver 204a may be fitted on a left side of the IAPN 204, an IR receiver 204b may be fitted on a right side of the IAPN 204, an IR receiver 204c may be fitted on a back side of the IAPN 204, an IR receiver 204d may be fitted on a front side of the IAPN 204, and the IR receiver 204e may be fitted in the center of IAPN 204 and facing the ground.

The IAPN 204 may further include a distance calculator 204f to calculate a distance of the custom wearable device 202 from the IAPN 204 based on a wavelength and a frequency of the IR signal received from the custom wearable device 202. In particular, the distance of the custom wearable device 202 from the IAPN 204 may be calculated based on each of the plurality of IR receivers that receive the wavelength and the frequency of the IR signal of the custom wearable device 202.

Further, the intelligent monitoring subsystem 206 may include a first trained machine learning model 206a to determine a valid usage of the custom wearable device 202 based on the set of evaluation parameters. In order to determine the valid usage, the first trained machine learning model 206a may determine whether the user wearing the custom wearable device 202 is an authorized user to wear the custom wearable device 202.

Once the valid usage of the custom wearable device 202 is determined, the intelligent monitoring subsystem 206 may further include a second trained machine learning model 206b to determine one of a valid presence or a valid movement of the custom wearable device 202 based on the set of evaluation parameters and the distance. In some embodiments, for determining the valid presence or the valid movement, the second trained machine learning model 206b may determine whether the custom wearable device 202 is within or outside an authorized predefined region. This is further explained in conjunction with FIG. 6B.

The intelligent monitoring subsystem 206 may further include an alerting module 208 that may generate an alert in response to determination of at least one the valid usage or the valid presence. In one embodiment, the alerting module 208 may generate the alert if the custom wearable device 202 is worn by the unauthorized user. In other embodiment, the alerting module 208 may generate the alert if the custom wearable device 202 is found to be out of a predefined authorized region.

Figure 3:
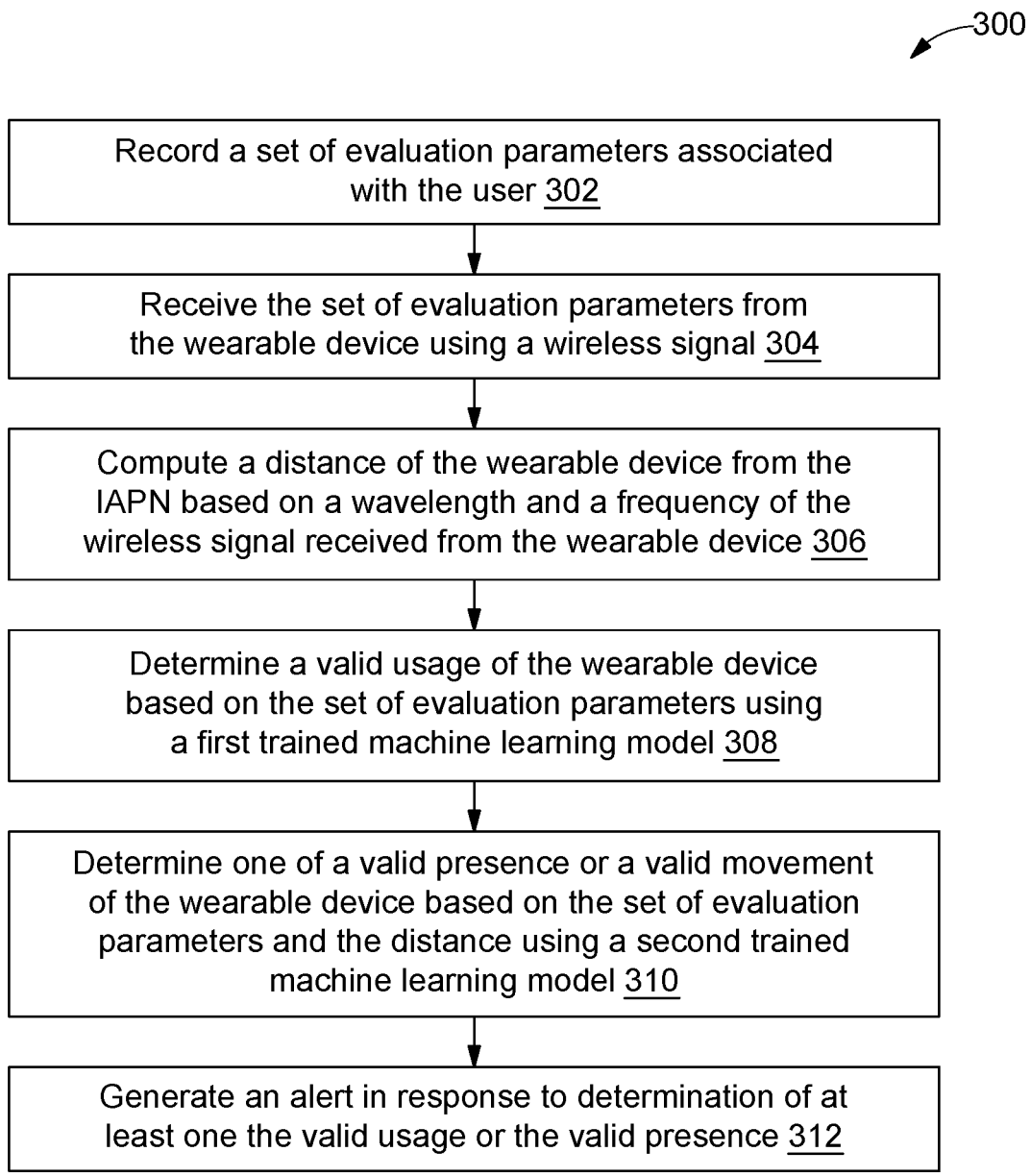
FIG. 3 illustrates a flowchart of a method for intelligently managing time and attendance of a user in an establishment, in accordance with some embodiments of the present disclosure.

Referring now to FIG. 3, a flowchart of a method 300 for intelligently managing time and attendance of a user in an establishment is illustrated, in accordance with some embodiments. Examples of the establishment may include, but are not limited to, shopping malls, supermarket, retail stores or retail premises, offices, manufacturing industries, and the like. At step 302, a set of evaluation parameters associated with the user may be recorded. The set of evaluation parameters may be recorded by the custom wearable device 202 worn by the user in a predefined region. The set of evaluation parameters may include at least one of gyroscope data, accelerometer data, and a wrist size of the corresponding user.

Further, at step 304, the set of evaluation parameters from the custom wearable device 202 may be received by the IAPN 204 installed within the predefined region, using a wireless signal. The wireless signal may be an infra-red (IR) signal. In some embodiments, the IAPN 204 may be installed on a ceiling of the corresponding predefined region, and the plurality of IR receivers may include an IR receiver on each of the four sides of the IAPN, and an IR receiver in the center of IAPN and facing the ground.

Once the set of evaluation parameters are received, then at step 306, a distance of the custom wearable device 202 from the IAPN 204 may be computed based on a wavelength and a frequency of the wireless signal received from the custom wearable device 202. In some embodiments, the distance of the custom wearable device 202 from the IAPN 204 may be calculated by the distance calculator 204f.

At step 308, a valid usage of the custom wearable device 202 may be determined based on the set of evaluation parameters using a first trained machine learning model. In some embodiments, the valid usage of the custom wearable device 202 may be determined by the intelligent monitoring subsystem 206. The determining of the valid usage may include determining whether the user wearing the custom wearable device 202 is an authorized user to wear the custom wearable device 202. In some embodiments, authenticity of the user may be determined based on the wrist size calculation of the user. The process of calculating the wrist size of the user is explained in greater detail in conjunction with FIG. 4A and FIG. 4B.

At step 310, one of a valid presence or a valid movement of the custom wearable device 202 may be determined based on the set of evaluation parameters and the distance using a second trained machine learning model. The determining of the valid presence or the valid movement may include determining whether the custom wearable device 202 is within or outside an authorized predefined region. In some embodiments, the one of a valid presence or a valid movement of the custom wearable device 202 may be determined by the intelligent monitoring subsystem 206.

In one embodiment, the first machine learning model may be trained based on historical evaluation parameters data, and the second machine learning model may be trained based on the historical evaluation parameters data and historical distance information in order to determine the valid usage or the valid presence of the custom wearable device 202.

In another embodiment, the first machine learning model and the second machine learning model may be trained based on at least one of recorded evaluation parameters data, straight distance data of the custom wearable device from the IAPN, authorized predefined region historic data, custom wearable device actual historic region data, authorized predefined region boundary parameters, and a unique user identity associated with the custom wearable device 202.

In response to the determination of at least one of the valid usage or the valid presence, at step 312, an alert may be generated. In some embodiments, the alert may be generated when the valid usage or the valid presence is in variance with a predefined user policy of the establishment. This is further explained in conjunction with FIG. 7B.

Referring now to FIG. 4A, wrist straps 400A (for example, a wrist strap 1 and a wrist strap 2) with sensors of the custom wearable device 202 for calculating the wrist size of the user is illustrated, in accordance with some embodiments. In an embodiment, the wrist strap 1 may include one or more slots. Each of the one or more slots may include a metal strip 404. The wrist strap 2 may include a metal push button clasp 402 and the sensors. In order to determine whether the user wearing the custom wearable device 202 is the authorized user to wear the custom wearable device 202, the wrist size of the user may be calculated. Therefore, to calculate the wrist size, the sensors may be embedded in each of the one or more slots of the wrist strap 1. The sensors layout and cross section of the wrist straps 400A may be depicted via the present FIG. 4A.

The sensors of the wrist strap 1 may determine the wrist size of the user based on slot occupancy of the wrist strap 1. For example, when the custom wearable device 202 may be worn by the user, during that time one of the slots of the wrist strap 1 may be occupied by the metal push button clasp 402, thereby locking slot of the wrist strap 1. It may be noted that for locking the slot, the metal push button clasp 402 may be inserted in one of the slot of the wrist strap 400A. It may also be noted that, when the custom wearable device 202 is not worn by any user, during that time the wrist strap 1 may be in unlocked position.

Figure 4B:
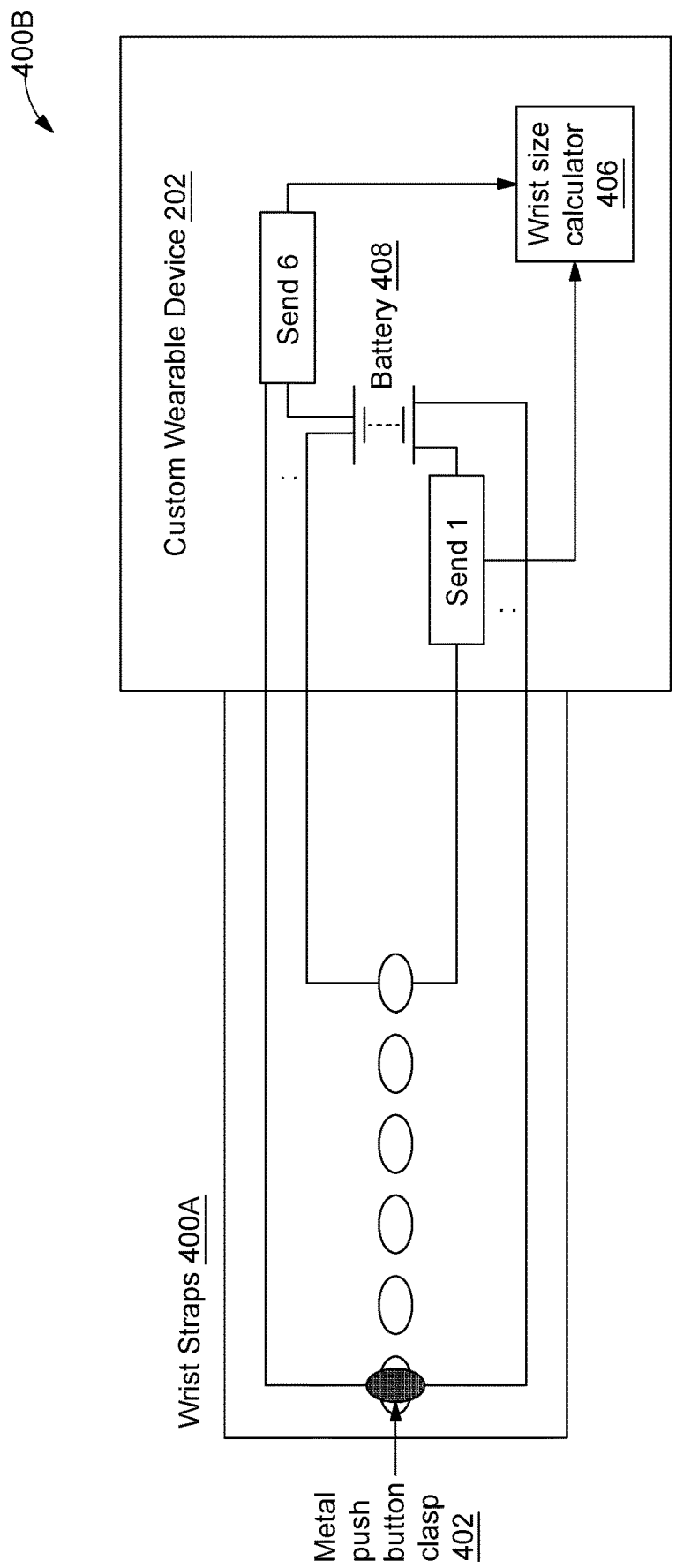
FIG. 4B illustrates a circuit of the wrist straps for calculating the wrist size of the user, in accordance with some embodiments of the present disclosure.

Referring now to FIG. 4B, a circuit 400B of the wrist straps for calculating the wrist size of the user is illustrated, in accordance with some embodiments. Once the metal push button clasp 402 is inserted in one of the slots of the wrist strap 1, the circuit 400B may be completed and a corresponding code may be sent to a wrist size calculator 406 via the metal strip 404. The circuit 400B may be activated once the metal strip 404 of the wrist strap 1 may be connected to a power source (for example, a battery 408) of the custom wearable device 202. The wrist size of the user may be calculated by the formula given below:

i.e., Wrist size=$x+y$*slot number+$z$

Where,
x=distance in mm from base of strap 1 to first slot
z=distance in mm from base of a strap 2 to metal push button clasp
slot number=the number of slots in which the metal push button is inserted
so, if x=20 mm
y=3 mm
z=50 mm
if 6th slot is used for tying custom wearable device 202 to the hand, then wrist size=20+3*6+50=88 mm Once the wrist size of the user is calculated, the wrist size information may be sent to the intelligent monitoring subsystem 206 through the IAPN 204. The intelligent monitoring subsystem 206 may further utilize the wrist size information to train the first machine learning model. The process of training the first machine learning model is explained in conjunction with FIG. 6A.

Figure 5:
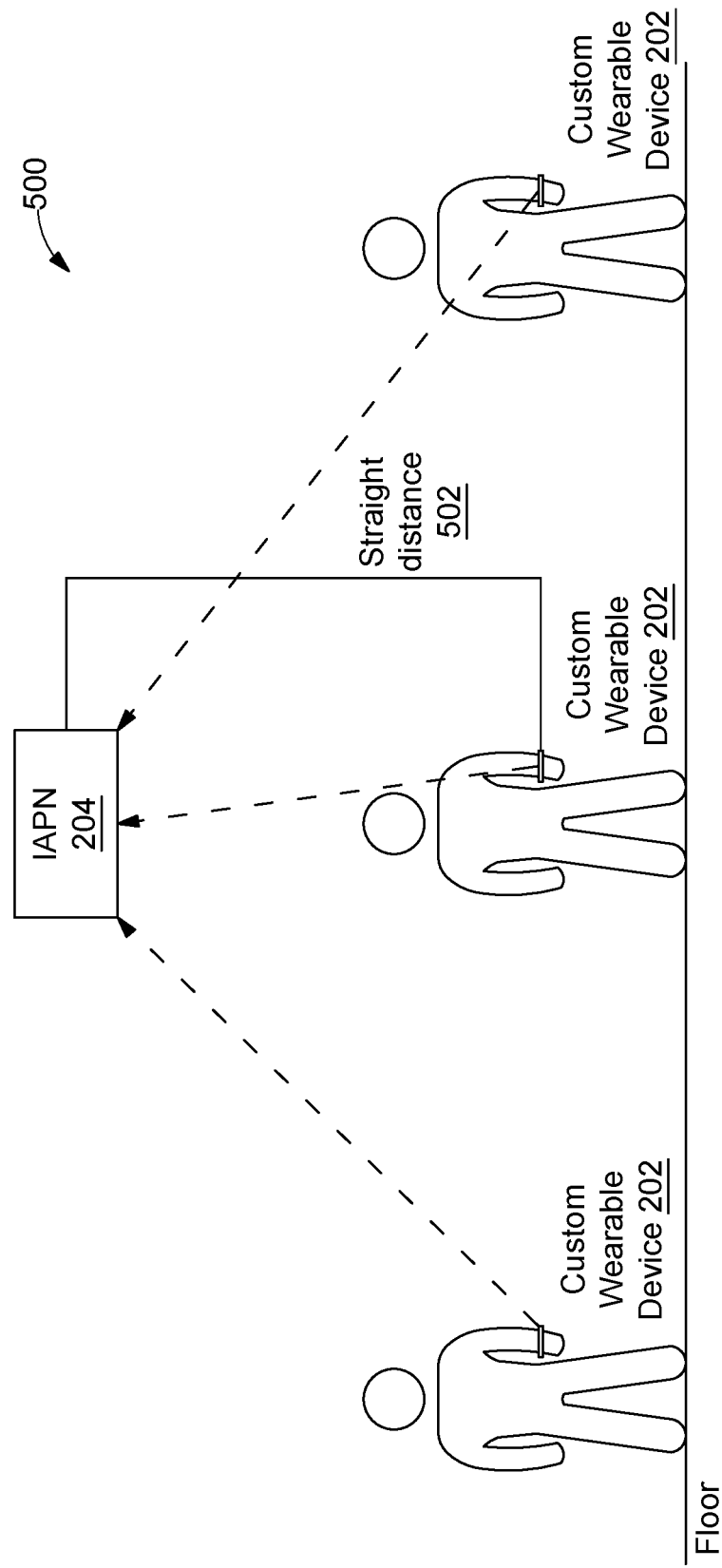
FIG. 5 illustrates a block diagram for distance calculation of the custom wearable device from the IAPN, in accordance with some embodiments of the present disclosure.

Referring now to FIG. 5, a block diagram 500 for distance calculation of the custom wearable device 202 from the IAPN 204 is illustrated, in accordance with some embodiments. The block diagram 500 depicting the IAPN 204 that may be installed on the ceiling of the predefined region. The IAPN 204 may include a plurality of IR receivers (not shown in FIG. 5) that may be configured to receive the set of evaluation parameters from the custom wearable device 202. The plurality of IR receivers may include an IR receiver on each of the four sides of the IAPN 204 and an IR receiver in the center of IAPN 204 and facing the ground.

The IAPN 204 may include the distance calculator (not shown in FIG. 5) that may be configured to calculate the distance of the custom wearable device 202 from the IAPN 204 based on the wavelength and the frequency of the IR signal received from the custom wearable device 202. As an example, the IR transmitter of the custom wearable device 202 may transmits the IR signal with defined wavelength and frequency to the IAPN 204. This IR signal may be get captured by the plurality of IR receivers of the IAPN 204 and then used for calculating the distance of the custom wearable device 202 from the IAPN 204.

Additionally, the distance calculator may be configured to calculate a first distance based on the IR signal received from the IR receiver on one of the four sides. Once the first distance is calculated, the distance calculator may further calculate a second minimum distance based on the IR signal received from the IR receiver facing the ground. Based on the first distance and the second distance, the distance calculator may further determine a physical stature of the user.

By way of an example, in order to calculate the distance of the custom wearable device 202 from the IAPN 204, the custom wearable device 202 may transmit the IR signal to the IAPN 204 at approximately every 5 seconds interval. It may be noted that, each of the user wearing the custom wearable device 202 may have a unique identity (ID) with the defined wavelength and defined frequency. Since the wavelength and the frequency of the IR signal associated with the custom wearable device 202 may be known to the IAPN 204, the distance calculator may identify the distance of the custom wearable device 202 based on the frequency of the IR signal bursts, the wavelength of the IR signal bursts, and a time between expected arrival of the IR signal if the custom wearable device 202 is nearest to the IAPN 204 and the actual arrival of the IR signal. For example, if the IR signal is received by the IR receiver 204e facing the ground, then the identified distance may be a straight distance 502 of the custom wearable device 202 from the IAPN 204. The straight distance 502 may be a minimum distance of the custom wearable device 202 from the IAPN 204. Based on the distance identification, an approximate physical stature (for example, an actual height) of the user may be identified.

Once the distance of the custom wearable device 202 from the IAPN 204 is calculated, the distance information may be sent to the intelligent monitoring subsystem 206. The intelligent monitoring subsystem 206, may determine one of the valid presence or the valid movement of the custom wearable device 202 based on the distance information. This is already explained in conjunction with FIG. 3.

Figure 6A:
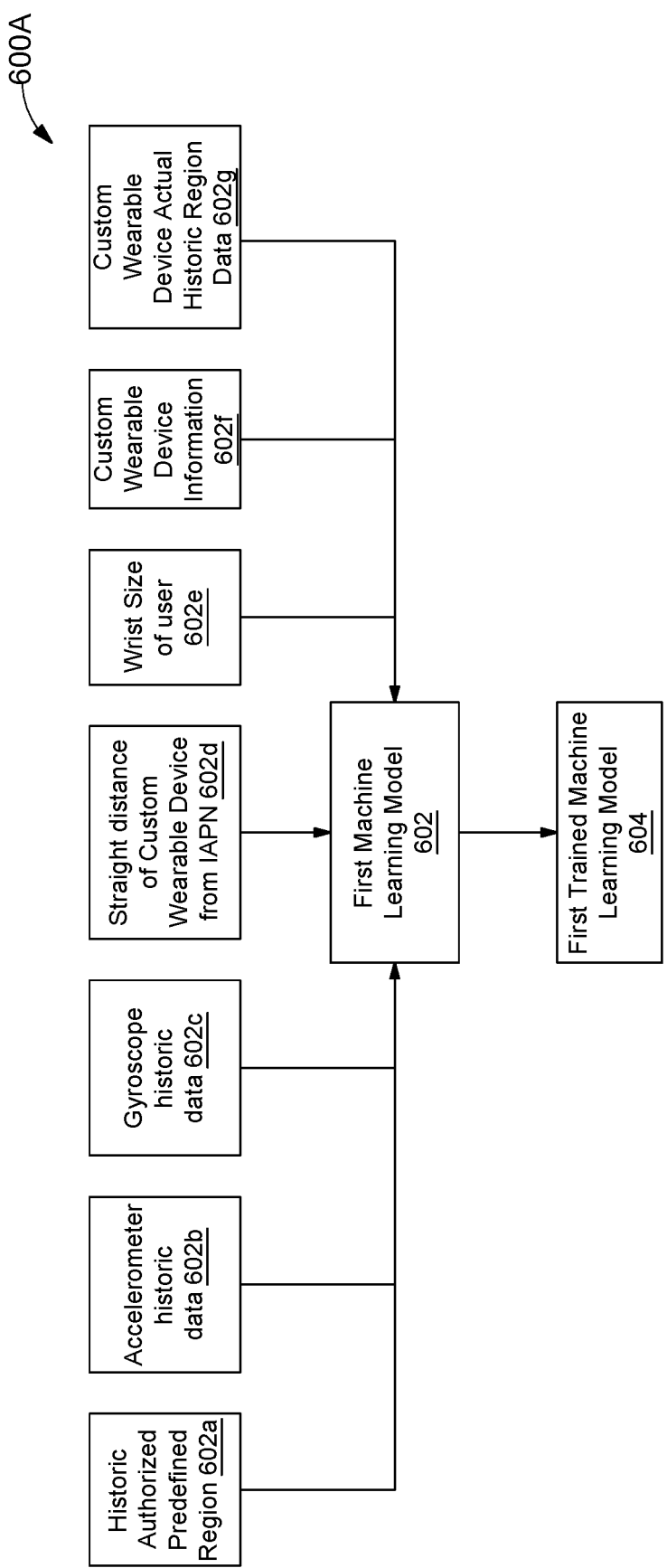
FIG. 6A illustrates an exemplary process for training a first machine learning model, in accordance with some embodiments of the present disclosure.

Referring now to FIG. 6A, an exemplary process 600A for training a first machine learning model is illustrated, in accordance with some embodiments. In reference to FIG. 3, the valid usage of the custom wearable device 202 may be determined based on the set of evaluation parameters using the first trained machine learning model 206a of the intelligent monitoring subsystem 206. In reference to the present FIG. 6A, at step 602, the first machine learning model may be trained based on historical evaluation parameters data (for example, accelerometer historic data 602b, and gyroscope historic data 602c), wrist size of user 602e, straight distance data 602d of the custom wearable device 202 from the IAPN 204, authorized predefined region historic data 602a, custom wearable device 202 actual region historic data 602g, and unique user identity associated with the custom wearable device 202 (for example, custom wearable device 202 information 602f).

The wrist size of the user 602e may be provided by the custom wearable device 202 based on fastening of one of the slots of the wrist strap 1. The custom wearable device 202 information 602f may help in associating the data received to the other historic readings received for the same custom wearable device 202. The custom wearable device 202 predefined region historic data 602g may help in associating past movements with respect to the current region in which the custom wearable device 202 may be operating. The authorized predefined region historic data 602a may help in identifying in which zone the user was authorized to operate. The observed straight distance data 602d of the custom wearable device 202 from IAPN 204 may help in determining actual height of the user. It may be noted that, the observed straight distance data may be changed over a day as user may raise his arms or seat down. The machine learning model may analyze the data received and uses the distance which may more frequently observed. Once the first machine learning model is trained, the first trained machine learning model may further be used to determine a valid usage of the custom wearable device 202. The process of determining the valid user is explained in conjunction with FIG. 6B.

Figure 6B:
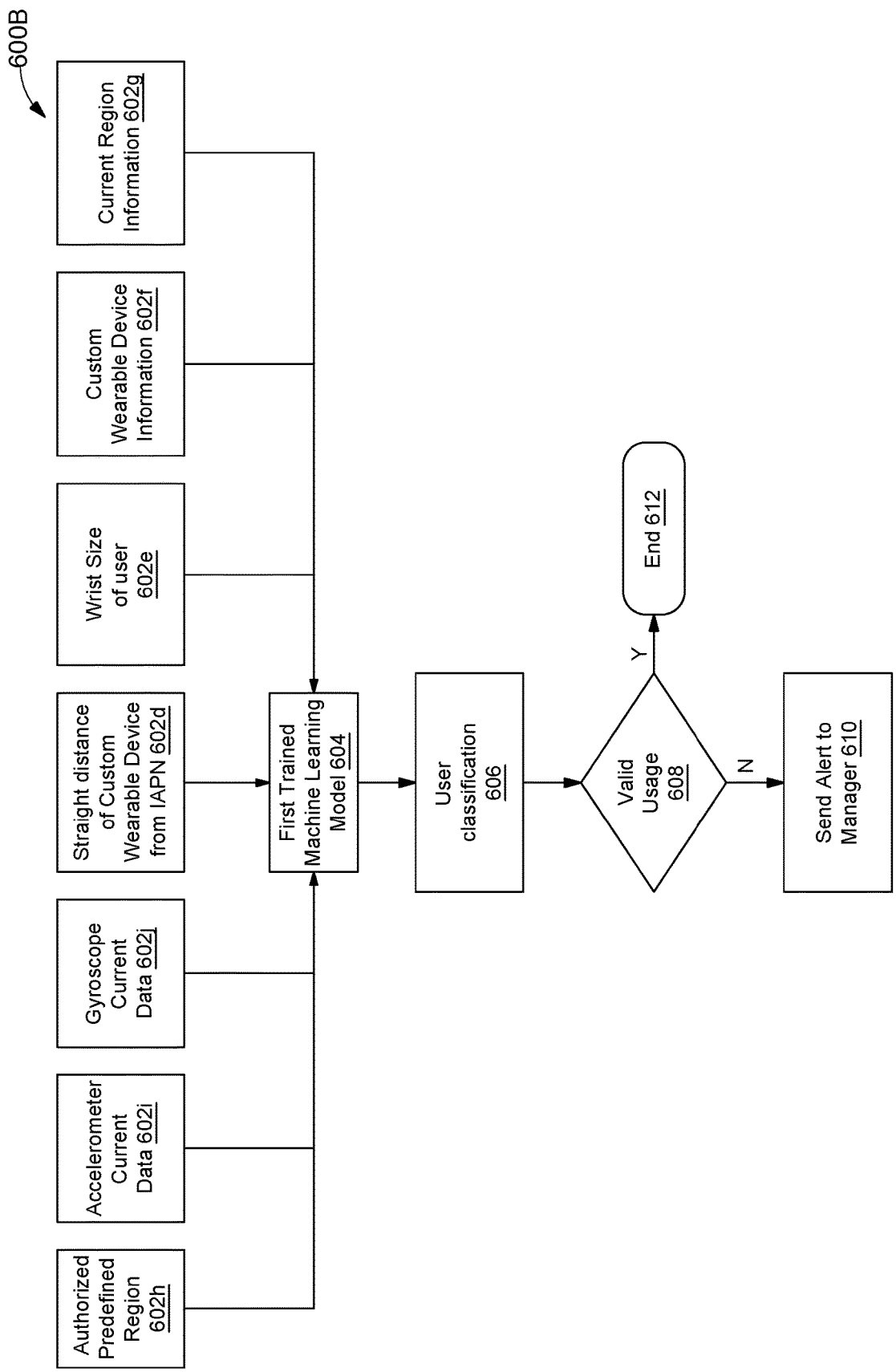
FIG. 6B illustrates an exemplary process for determining a valid usage of the custom wearable device based on the first machine learning model, in accordance with some embodiments of the present disclosure.

Referring now to FIG. 6B, an exemplary process 600B for determining a valid usage of the custom wearable device 202 based on the first machine learning model is illustrated, in accordance with some embodiments. In order to determine the valid usage, initially, at step 604, the first trained machine learning model may receive recorded evaluation parameters data (for example, accelerometer current data 602*i*, gyroscope current data 602*j*, and wrist size of user 602*e*), authorized predefined region data 602*h*, custom wearable device information 602*f*, current region data 602*k*, and straight distance data 602*d* of the custom wearable device 202 from IAPN 204.

Based on the received data as mentioned above, the first trained machine learning model may classify a usage of the custom wearable device 202 into valid or invalid category, at step 606. For example, the first trained machine learning model may determine whether the user wearing the custom wearable device 202 is an authorized user to wear the wearable device. If the usage is classified as valid, at step 608 i.e., the custom wearable device 202 is worn by the authorized user, then process ends at step 612. If the usage is classified as invalid, at step 608 i.e., the custom wearable device 202 is worn by an unauthorized user, then the intelligent monitoring subsystem 206 may generate an alert and send out to a manager or a higher authority associated with the custom wearing device 202, at step 610.

Figure 7A:
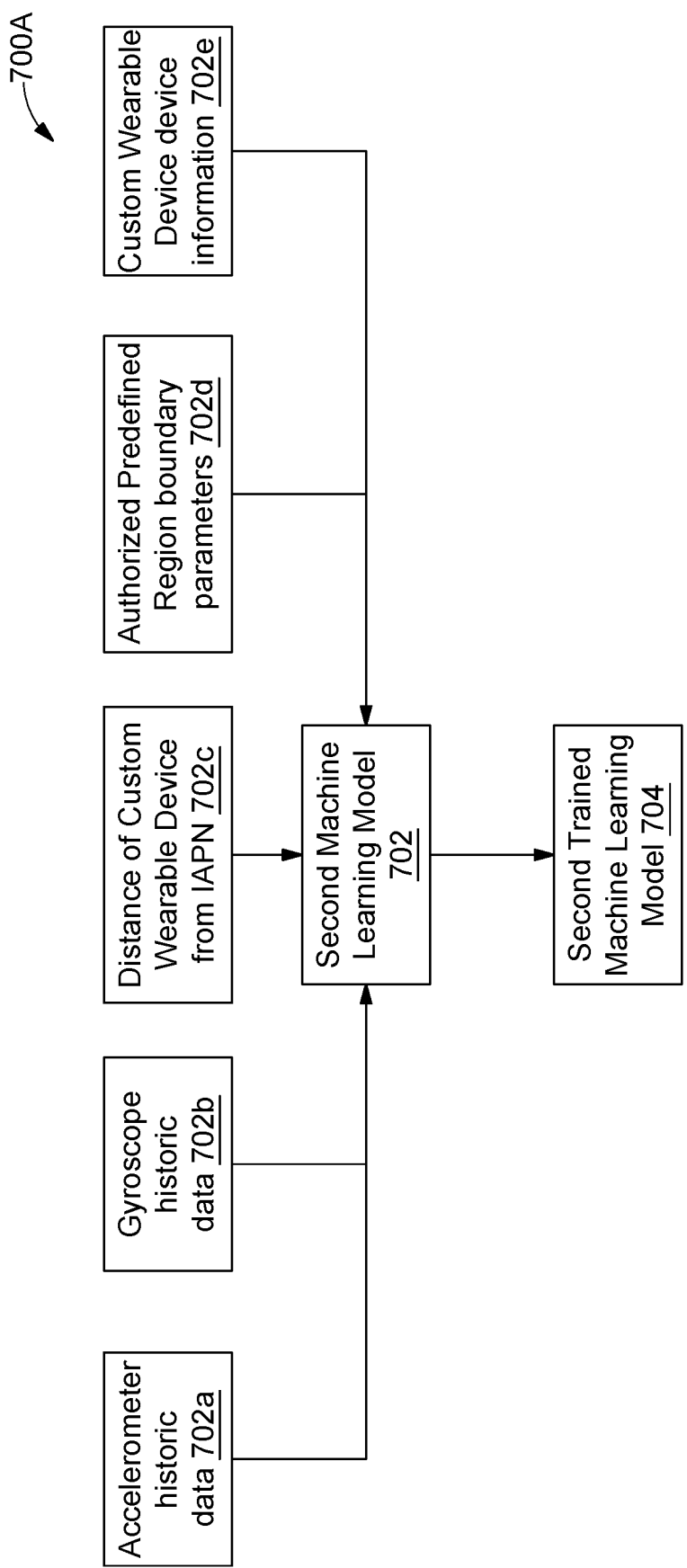
FIG. 7A illustrates an exemplary process for training a second machine learning model, in accordance with some embodiments of the present disclosure.

Referring now to FIG. 7A, an exemplary process 700A for training a second machine learning model is illustrated, in accordance with some embodiments. In an embodiment, at step 702, the second machine learning model may be trained based on the historical evaluation parameters data (for example, accelerometer historic data 702*a*, and gyroscope historic data 702*b*), historical distance information of the custom wearable device 202 from the IAPN 204, and authorized predefined region boundary parameters 702*d* i.e., a predefined distance to boundaries on each side from the IAPN 204, distance data 702*c* of custom wearable device 202 from the IAPN 204, and custom wearable device 202 information 702*e*. The trained second machine learning model may be used to identify if the custom wearable device 202 is within or outside an authorized predefined region.

An exemplary process 700B for determining one of a valid presence or a valid movement of the custom wearable device 202 is illustrated in FIG. 7B. In order to determine one of the valid presence or the valid movement, initially, at step 704, the second machine learning model may receive accelerometer current data 702*f*, gyroscope current data 702*g*, authorized predefined region boundary parameters 702*d*, distance data 702*c* of custom wearable device 202 from the IAPN 204, and custom wearable device 202 information 702*e*. The trained second machine learning model may determine whether the custom wearable device 202 is within or outside an authorized predefined region. If the custom wearable device 202 is found to be outside the authorized predefined region, then at step 706, the second trained machine learning model may predict an intent of user movement and classify the intent of the user movement into one of a valid movement or an invalid movement.

Further, at step 708, the second trained machine learning model may verify if the intent of the user is a valid or an authorized movement. In an embodiment, the verification of user movement may be performed based on employee shift and/or employee break information 708*a*, custom wearable device 202 current region information 708*b*, and custom wearable device 202 authorized predefined region information 708*c*.

Further, at step 710, if the intent of the user movement is found to be the valid or the authorized movement, then the process may be end at step 712. Additionally, at step 710, if the intent of the user movement is found to be the invalid or an unauthorized movement, then an alert may be generated and sent to the custom wearable device 202 or the manager, at step 710*a* and step 710*b*, respectively.

As an example, if user's intent is to not move out of the predefined region but if user is found to be in the unauthorized region and if is not on break, then the alert may be sent to the manager as well as to the custom wearable device 202. Moreover, if user's intent is to move out of the authorized predefined region and if the user is not on the break, then user is alerted. If user is already out of the zone, then alert may be sent to the manager.

Figure 8:
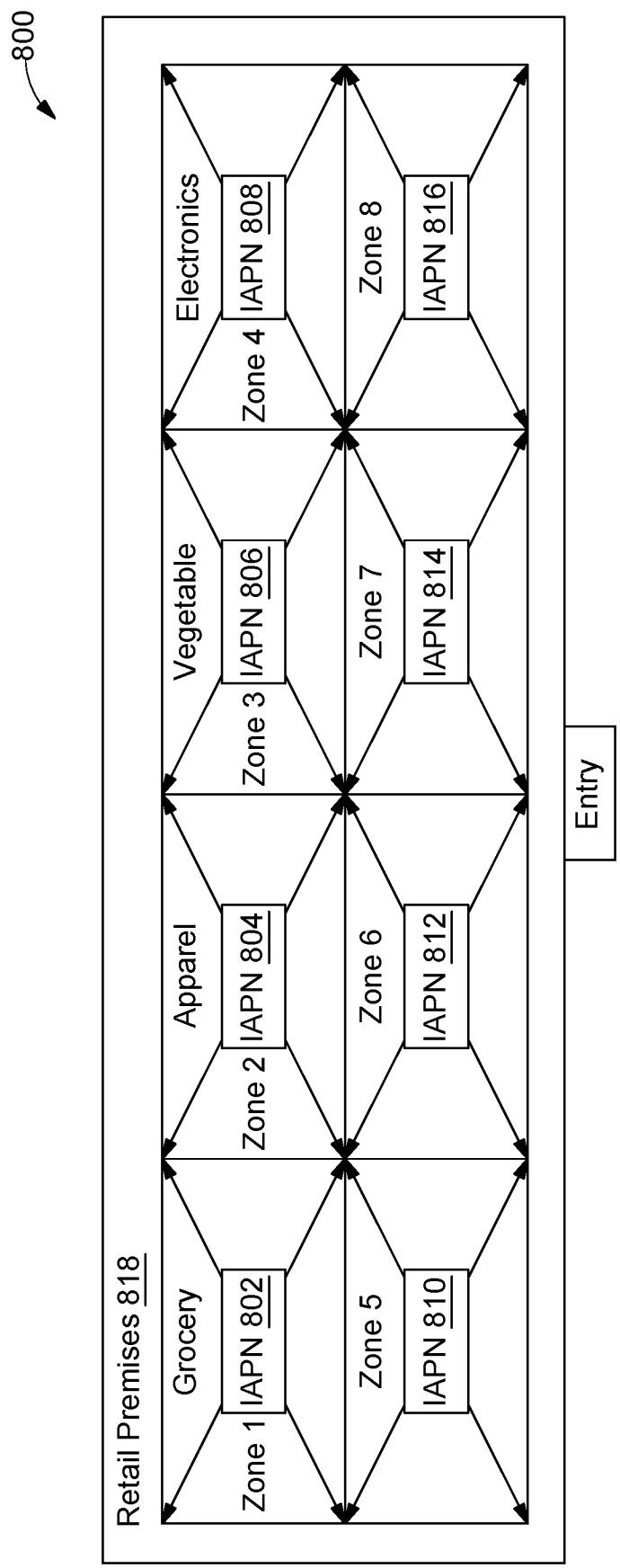
FIG. 8 illustrates an exemplary establishment depicting a set of predefined regions and the associated IAPN configured to intelligently manage time and attendance of user, in accordance with some embodiments of the present disclosure.

Referring now to FIG. 8, an exemplary establishment 800 depicting a set of predefined regions and a corresponding IAPN configured to intelligently manage time and attendance of a user is illustrated, in accordance with an exemplary embodiment. The exemplary establishment 800 may be of a retail premises 818. The retail premises 818 may be divide into a set of predefined regions. The set of predefined regions may be, for example, a grocery section, an apparels section, a vegetable section, an electronic section, and a plurality of checkout sections. Further, a corresponding zone may be assigned to each of the set of predefined regions. For example, a zone 1 may be assigned to the grocery section, a zone 2 may be assigned to the apparels section, a zone 3 may be assigned to the vegetable section, a zone 4 may be assigned to the electronic section and zone 5, zone 6, zone 7 and zone 8 may be assigned to each of the plurality of checkout sections.

Each of the predefined region may have specific type skilled employees. For example, the employees working in apparels section may have knowledge on clothing lines, brands, etc. The electronics section employees may have technical knowledge on electronic parts, brands, etc. Therefore, each of the employees is to be in his/her allotted predefined region during their shift time.

In order to intelligently manage time and attendance of the user within the exemplary establishment 800, an IAPN may be installed on the ceiling of the corresponding predefined region. For example, the zone 1 may include an IAPN 802, the zone 2 may include an IAPN 804, the zone 3 may include an IAPN 806, the zone 4 may include an IAPN 808, the zone 5 may include an IAPN 810, the zone 6 may include an IAPN 812, the zone 7 may include an IAPN 814, the zone 8 may include an IAPN 816. The process of is further explained in conjunction with FIG. 9.

Figure 9:
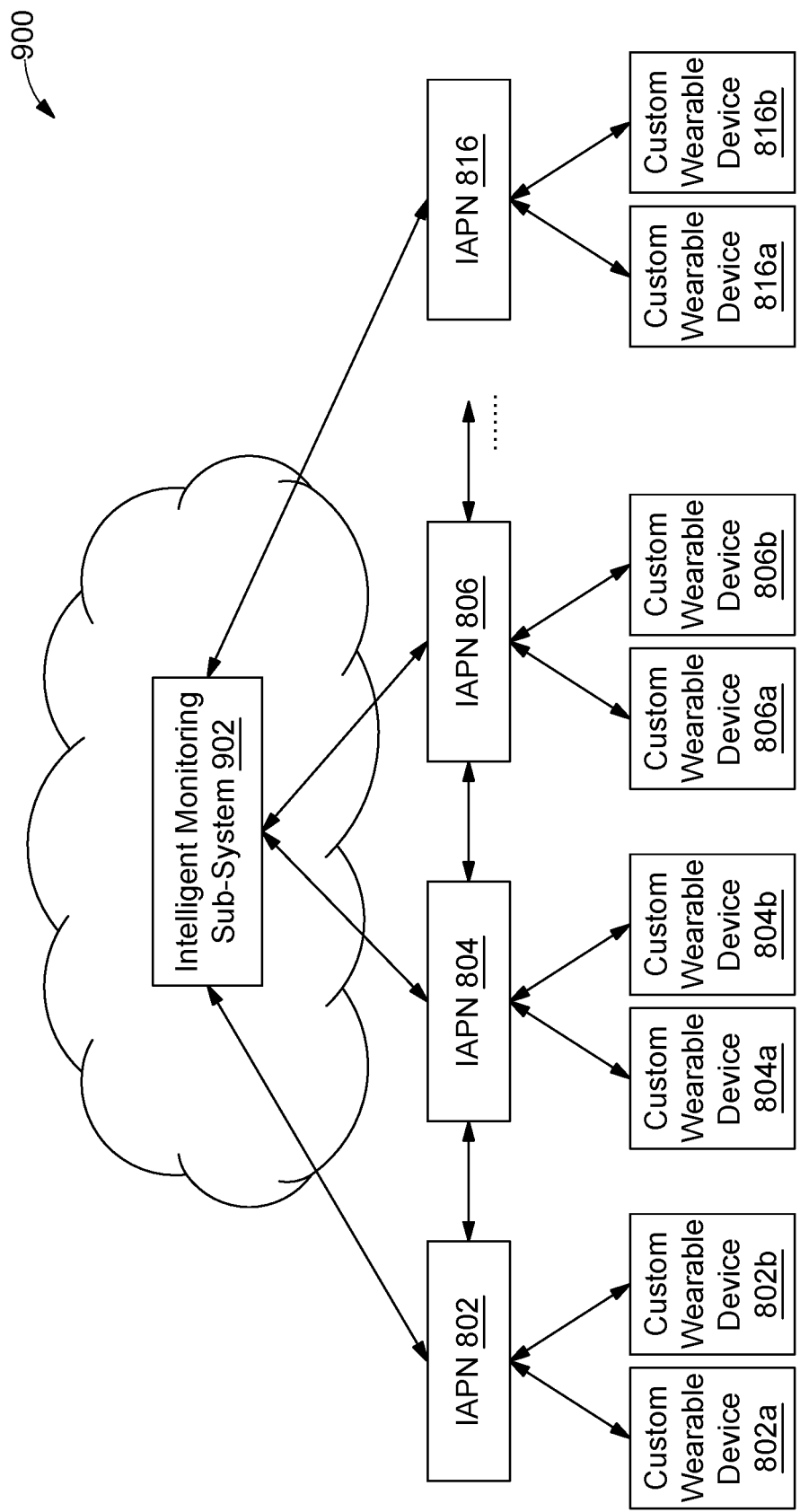
FIG. 9 illustrates an exemplary system for intelligent time and attendance management, in accordance with some embodiments of the present disclosure.

Referring now to FIG. 9, an exemplary system 900 for intelligent time and attendance management is illustrated, in accordance with some embodiments. Each of the IAPN may be capable of communicating with the corresponding set of custom wearable devices that is within an authorized predefined region, from among the plurality of wearable devices. It may be noted that, the set of wearable devices within the corresponding predefined region is pre-approved. For example, a custom wearable device 802*a* and a custom wearable device 802*b* may be capable of transmitting the plurality of evaluation parameters to the IAPN 802. In a similar manner, a custom wearable device 804*a* and a custom wearable device 804*b* may be capable of transmitting the plurality of evaluation parameters to the IAPN 804, a custom wearable device 806*a* and a custom wearable device 806*b* may be capable of transmitting the plurality of evaluation parameters to the IAPN 806, and a custom wearable device 816*a* and a custom wearable device 816*b* may be capable of transmitting the plurality of evaluation parameters to the IAPN 816.

The IAPN installed within each of the set of predefined regions may be configured to receive the set of evaluation parameters from each of the set of custom wearable devices, from among the plurality of wearable devices, within a corresponding predefined region using a wireless signal.

Each of the IAPN may further include a distance calculator to calculate a distance of each of the set of wearable devices from the corresponding IAPN based on a wavelength and a frequency of the wireless signal received from the corresponding wearable device. A method of calculating the distance of each of the set of wearable devices from the IAPN 104 is already explained in greater detail in conjunction with FIG. 5.

The exemplary system 900 may further include an intelligent monitoring subsystem 902 that may be configured to determine, for each of the plurality of custom wearable devices, a valid usage of the corresponding custom wearable device based on the set of evaluation parameters using a first trained machine learning model. In order to determine the valid usage, the intelligent monitoring subsystem 902 may determine whether the user wearing the corresponding custom wearable device is an authorized user to wear the wearable device.

For each of the plurality of custom wearable devices, the intelligent monitoring subsystem 902 may further determine one of a valid presence or a valid movement of the corresponding custom wearable device 202 based on the set of evaluation parameters and the distance using a second trained machine learning model. In order to determine the valid presence or the valid movement, the intelligent monitoring subsystem 902 may determine whether the corresponding custom wearable device 202 is within or outside an authorized predefined region. For one or more of the plurality of wearable devices, the intelligent monitoring subsystem 902 may further generate an alert in response to determination of at least one the valid usage or the valid presence. The generated alert may be sent out to the respective manager, respective custom wearable device, or both based on the user intent.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 10:
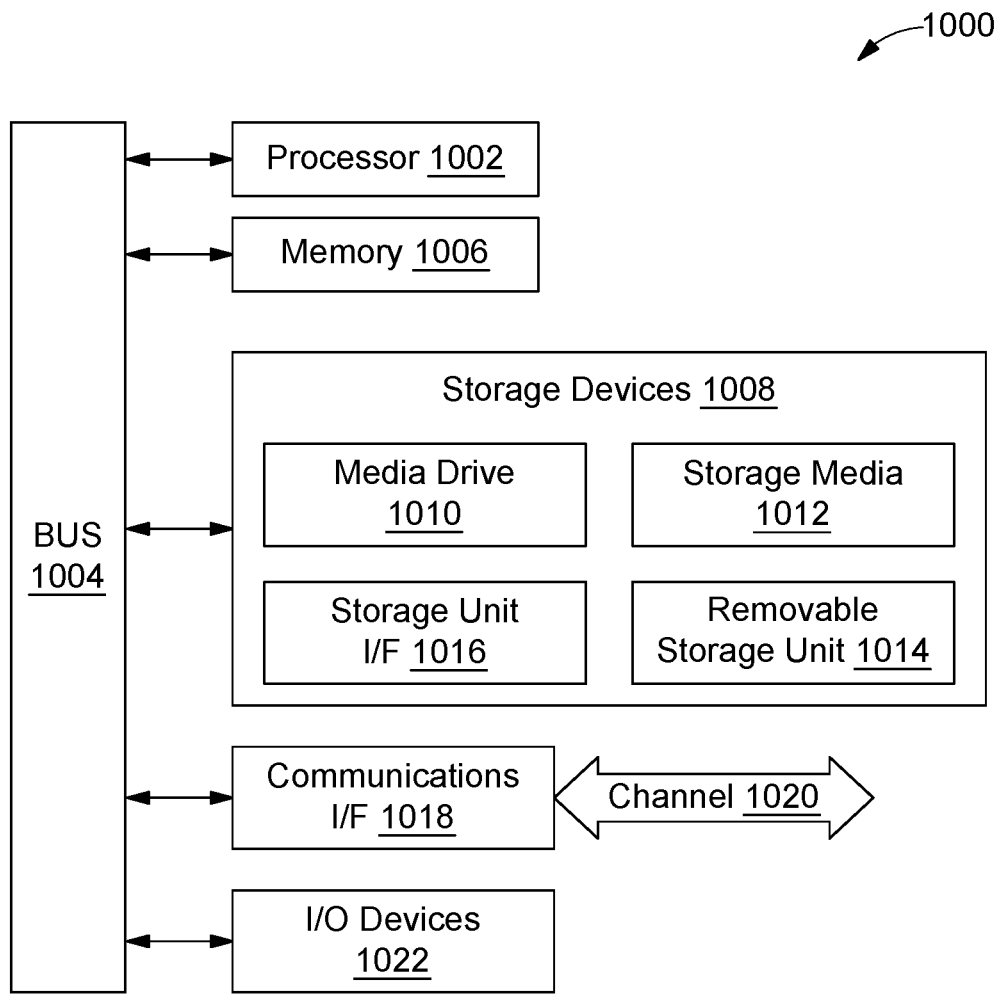
FIG. 10 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 10, an exemplary computing system 1000 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1000 may represent, for example, a user device such as a desktop, a laptop, a mobile phone, personal entertainment device, DVR, and so on, or any other type of special or general-purpose computing device as may be desirable or appropriate for a given application or environment. The computing system 1000 may include one or more processors, such as a processor 1002 that may be implemented using a general or special purpose processing engine such as, for example, a microprocessor, microcontroller or other control logic. In this example, the processor 1002 is connected to a bus 1004 or other communication medium. In some embodiments, the processor 1002 may be an Artificial Intelligence (AI) processor, which may be implemented as a Tensor Processing Unit (TPU), or a graphical processor unit, or a custom programmable solution Field-Programmable Gate Array (FPGA).

The computing system 1000 may also include a memory 1006 (main memory), for example, Random Access Memory (RAM) or other dynamic memory, for storing information and instructions to be executed by the processor 1002. The memory 1006 also may be used for storing temporary variables or other intermediate information during execution of instructions to be executed by the processor 1002. The computing system 1000 may likewise include a read only memory ("ROM") or other static storage device coupled to bus 1004 for storing static information and instructions for the processor 1002.

The computing system 1000 may also include storage devices 1008, which may include, for example, a media drive 1010 and a removable storage interface. The media drive 1010 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1012 may include, for example, a hard disk, magnetic tape, flash drive, or other fixed or removable medium that is read by and written to by the media drive 1010. As these examples illustrate, the storage media 1012 may include a computer-readable storage medium having stored therein particular computer software or data.

In alternative embodiments, the storage devices 1008 may include other similar instrumentalities for allowing computer programs or other instructions or data to be loaded into the computing system 1000. Such instrumentalities may include, for example, a removable storage unit 1014 and a storage unit interface 1016, such as a program cartridge and cartridge interface, a removable memory (for example, a flash memory or other removable memory module) and memory slot, and other removable storage units and interfaces that allow software and data to be transferred from the removable storage unit 1014 to the computing system 1000.

The computing system 1000 may also include a communications interface 1018. The communications interface 1018 may be used to allow software and data to be transferred between the computing system 1000 and external devices. Examples of the communications interface 1018 may include a network interface (such as an Ethernet or other NIC card), a communications port (such as for example, a USB port, a micro USB port), Near field Communication (NFC), etc. Software and data transferred via the communications interface 1018 are in the form of signals which may be electronic, electromagnetic, optical, or other signals capable of being received by the communications interface 1018. These signals are provided to the communications interface 1018 via a channel 1020. The channel 1020 may carry signals and may be implemented using a wireless medium, wire or cable, fiber optics, or other communications medium. Some examples of the channel 1020 may include a phone line, a cellular phone link, an RF link, a Bluetooth link, a network interface, a local or wide area network, and other communications channels.

The computing system 1000 may further include Input/Output (I/O) devices 1022. Examples may include, but are not limited to a display, keypad, microphone, audio speakers, vibrating motor, LED lights, etc. The I/O devices 1022 may receive input from a user and also display an output of the computation performed by the processor 1002. In this document, the terms "computer program product" and "computer-readable medium" may be used generally to refer to media such as, for example, the memory 1006, the storage devices 1008, the removable storage unit 1014, or signal(s) on the channel 1020. These and other forms of computer-readable media may be involved in providing one or more sequences of one or more instructions to the processor 1002 for execution. Such instructions, generally referred to as "computer program code" (which may be grouped in the form of computer programs or other groupings), when executed, enable the computing system 1000 to perform features or functions of embodiments of the present invention.

In an embodiment where the elements are implemented using software, the software may be stored in a computer-readable medium and loaded into the computing system 1000 using, for example, the removable storage unit 1014, the media drive 1010 or the communications interface 1018. The control logic (in this example, software instructions or computer program code), when executed by the processor 1002, causes the processor 1002 to perform the functions of the invention as described herein.

As will be appreciated by those skilled in the art, the techniques described in the various embodiments discussed above are not routine, or conventional, or well understood in the art. The techniques discussed above provide for intelligently managing time and attendance of the user in the establishment. Further, the techniques may identify and track employees using machine learning driven intelligent monitoring subsystem that may receive data from the IAPN and the custom wearable device 202 capable of identifying associated person. The techniques may be further capable of determining the distance of the custom wearable device 202 from the IAPN by the IR signal. The techniques may further include the wrist strap with sensors to measure size of user's wrist. The techniques may be capable of recording height of the user, wrist size of the user, accelerometer data and gyroscope data of the user in order to identify the valid usage, valid presence or valid movement of the custom wearable device 202 within the predefined region.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for intelligently managing time and attendance of the user in the establishment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An intelligent time and attendance management system, the system comprising:
    a plurality of custom wearable devices configured to be worn by a plurality of users within a set of predefined regions, wherein each of the plurality of custom wearable devices record a set of evaluation parameters associated with a corresponding user, from among the plurality of users, using a set of sensors;
        wherein the custom wearable device comprises a wrist strap with sensors, a gyroscope, an accelerometer, a wrist size calculator,
            wherein custom wearable device is at least one of wrist bands, smart watches, body mounted sensors, and rings; and
        wherein the set of evaluation parameters comprises at least one of gyroscope data, accelerometer data, and a wrist size of the corresponding user;
    an Intelligent Access Point Network (IAPN) installed within each of the set of predefined regions and configured to receive the set of evaluation parameters from each of a set of custom wearable devices, from among the plurality of custom wearable devices, within a corresponding predefined region using a wireless signal, wherein the IAPN comprises:
        a distance calculator configured to calculate a distance of each of the set of custom wearable devices from the IAPN based on a wavelength and a frequency of the wireless signal received from the corresponding custom wearable device; and
    an intelligent monitoring subsystem configured to:
        determine, for each of the plurality of custom wearable devices, a valid usage of the corresponding custom wearable device based on the set of evaluation parameters using a first trained machine learning model, wherein determining the valid usage comprises determining whether the user wearing the corresponding custom wearable device is an authorized user to wear the custom wearable device;
wherein the first trained machine learning model is trained based on historical evaluation parameters data, wrist size of user, straight distance data of the custom wearable device from the IAPN, authorized predefined region historic data, custom wearable device actual region historic data, and a unique user identity associated with each of the plurality of custom wearable devices;
determine, for each of the plurality of custom wearable devices, one of a valid presence or a valid movement of the corresponding custom wearable device based on the set of evaluation parameters and the distance using a second trained machine learning model, wherein determining the valid presence or the valid movement comprises determining whether the corresponding custom wearable device is within or outside an authorized predefined region;
wherein the second trained machine learning model is trained based on the historical evaluation parameters data, historical distance information of the custom wearable device from the IAPN, authorized predefined region boundary parameters, distance data of the custom wearable device from the IAPN, and custom wearable device information; and
generate, for one or more of the plurality of custom wearable devices, an alert in response to determination of at least one the valid usage or the valid presence.

2. The system of claim 1, wherein the set of custom wearable devices within the corresponding predefined region is pre-approved.

3. The system of claim 1, wherein the wireless signal comprises an infra-red (IR) signal, wherein the IAPN comprises a plurality of IR receivers located within the corresponding predefined region, and wherein each of the set of custom wearable devices within the corresponding predefined region comprises an IR transmitter.

4. The system of claim 3, wherein the IAPN is installed on a ceiling of the corresponding predefined region, and wherein the plurality of IR receivers comprises an IR receiver on each of four sides of the IAPN, and an IR receiver in a center of the IAPN and facing a ground.

5. The system of claim 1, wherein the distance calculator is configured to:
calculate a first distance based on the IR signal received from the IR receiver on one of the four sides;
calculate a second minimum distance based on the IR signal received from the IR receiver facing the ground; and
determine a physical stature of the corresponding user based on the first distance and the second distance.

6. The system of claim 1, wherein the alert is generated when the valid usage or the valid presence is in variance with a pre-defined user policy of an establishment.

7. A method for intelligently managing time and attendance of a user in an establishment, the method comprising:
recording, by a custom wearable device worn by the user in a predefined region, a set of evaluation parameters associated with the user;
wherein the custom wearable device comprises a wrist strap with sensors, a gyroscope, an accelerometer, a wrist size calculator,
wherein custom wearable device is at least one of wrist bands, smart watches, body mounted sensors, and rings; and
wherein the set of evaluation parameters comprises at least one of gyroscope data, accelerometer data, and a wrist size of the corresponding user;
receiving, by an intelligent Access Point Network (IAPN) installed within the predefined region, the set of evaluation parameters from the custom wearable device using a wireless signal;
computing, by a distance calculator of the IAPN, a distance of the custom wearable device from the IAPN based on a wavelength and a frequency of the wireless signal received from the custom wearable device;
determining, by an intelligent monitoring subsystem, a valid usage of the custom wearable device based on the set of evaluation parameters using a first trained machine learning model, wherein determining the valid usage comprises determining whether the user wearing the custom wearable device is an authorized user to wear the custom wearable device;
wherein the first trained machine learning model is trained based on historical evaluation parameters data, wrist size of user, straight distance data of the custom wearable device from the IAPN, authorized predefined region historic data, custom wearable device actual region historic data, and a unique user identity associated with each of the plurality of custom wearable devices;
determining, by the intelligent monitoring subsystem, one of a valid presence or a valid movement of the custom wearable device based on the set of evaluation parameters and the distance using a second trained machine learning model, wherein determining the valid presence or the valid movement comprises determining whether the custom wearable device is within or outside an authorized predefined region;
wherein the second trained machine learning model is trained based on the historical evaluation parameters data, historical distance information of the custom wearable device from the IAPN, authorized predefined region boundary parameters, distance data of the custom wearable device from the IAPN, and custom wearable device information; and
generating, by the intelligent monitoring subsystem, an alert in response to determination of at least one the valid usage or the valid presence.

8. The method of claim 7, wherein the custom wearable device within the predefined region is pre-approved.

9. The method of claim 7, wherein the wireless signal comprises an infra-red (IR) signal, wherein the IAPN comprises a plurality of IR receivers located within the predefined region, and wherein the custom wearable device within the predefined region comprises an IR transmitter.

10. The method of claim 9, wherein the IAPN is installed on a ceiling of the predefined region, and wherein the plurality of IR receivers comprises an IR receiver on each of four sides of the IAPN, and an IR receiver in a center of IAPN and facing a ground.

11. The method of claim 7, wherein the distance calculator is configured to:
calculate a first distance based on the IR signal received from the IR receiver on one of the four sides;

calculate a second minimum distance based on the IR signal received from the IR receiver facing the ground; and determine a physical stature of the user based on the first distance and the second distance.

12. The method of claim 7, wherein the alert is generated when the valid usage or the valid presence is in variance with a predefined user policy of the establishment.

13. A computer program product for intelligently managing time and attendance of a user in an establishment, the computer program product being embodied in a non-transitory computer readable storage medium and comprising computer instructions for:

recording, by a custom wearable device worn by the user in a predefined region, a set of evaluation parameters associated with the user;
wherein the custom wearable device comprises a wrist strap with sensors, a gyroscope, an accelerometer, a wrist size calculator,
wherein custom wearable device is at least one of wrist bands, smart watches, body mounted sensors, and rings; and
wherein the set of evaluation parameters comprises at least one of gyroscope data, accelerometer data, and a wrist size of the corresponding user;
receiving, by an intelligent Access Point Network (IAPN) installed within the predefined region, the set of evaluation parameters from the custom wearable device using a wireless signal;
computing, by a distance calculator of the IAPN, a distance of the custom wearable device from the IAPN based on a wavelength and a frequency of the wireless signal received from the custom wearable device;
determining, by an intelligent monitoring subsystem, a valid usage of the custom wearable device based on the set of evaluation parameters using a first trained machine learning model, wherein determining the valid usage comprises determining whether the user wearing the custom wearable device is an authorized user to wear the custom wearable device;
wherein the first trained machine learning model is trained based on historical evaluation parameters data, wrist size of user, straight distance data of the custom wearable device from the IAPN, authorized predefined region historic data, custom wearable device actual region historic data, and a unique user identity associated with each of the plurality of custom wearable devices;
determining, by the intelligent monitoring subsystem, one of a valid presence or a valid movement of the custom wearable device based on the set of evaluation parameters and the distance using a second trained machine learning model, wherein determining the valid presence or the valid movement comprises determining whether the custom wearable device is within or outside an authorized predefined region;
wherein the second trained machine learning model is trained based on the historical evaluation parameters data, historical distance information of the custom wearable device from the IAPN, authorized predefined region boundary parameters, distance data of the custom wearable device from the IAPN, and custom wearable device information; and
generating, by the intelligent monitoring subsystem, an alert in response to determination of at least one the valid usage or the valid presence.

* * * * *